United States Patent
Olson et al.

(10) Patent No.: US 7,319,870 B2
(45) Date of Patent: Jan. 15, 2008

(54) METHOD FOR SUBSCRIBING TO A WIRELESS SERVICE

(75) Inventors: Scott A. Olson, Davie, FL (US); Robert E. Stengel, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 797 days.

(21) Appl. No.: 10/029,107

(22) Filed: Dec. 20, 2001

(65) Prior Publication Data

US 2003/0120583 A1   Jun. 26, 2003

(51) Int. Cl.
*H04Q 7/20* (2006.01)
*G06Q 40/00* (2006.01)

(52) U.S. Cl. .............. 455/432.1; 705/1; 455/3.05; 455/434; 370/480; 370/485

(58) Field of Classification Search ............ 705/35, 705/37, 26, 1, 5, 39, 41; 455/3.04, 3.05, 455/3, 432–434, 480–485; 370/480, 485
See application file for complete search history.

(56) References Cited

U.S. PATENT DOCUMENTS

| | | | |
|---|---|---|---|
| 5,301,359 A * | 4/1994 | Van den Heuvel et al. . | 455/524 |
| 5,826,244 A | 10/1998 | Huberman | |
| 6,078,906 A | 6/2000 | Huberman | |
| 6,181,734 B1 * | 1/2001 | Palermo ................. | 375/219 |
| 6,549,625 B1 * | 4/2003 | Rautila et al. ............ | 380/258 |
| 7,158,753 B2 * | 1/2007 | Kagan et al. ............. | 455/3.04 |
| 2002/0058532 A1 * | 5/2002 | Snelgrove et al. ......... | 455/557 |
| 2002/0099562 A1 * | 7/2002 | Bruce et al. .............. | 705/1 |
| 2002/0183059 A1 * | 12/2002 | Noreen et al. ........... | 455/427 |

FOREIGN PATENT DOCUMENTS

| | | |
|---|---|---|
| WO | WO 96/14719 | 5/1996 |
| WO | WO 97/44974 | 11/1997 |
| WO | WO 01/76262 A2 * | 10/2001 |

OTHER PUBLICATIONS

"iBiquity Digital Announces First Digital Radio Wireless Data Conference." PR Newsire. New York: Sep. 6, 2001. p. 1.*

* cited by examiner

*Primary Examiner*—Hani M. Kazimi
*Assistant Examiner*—Daniel Kesack

(57) ABSTRACT

A method is provided for configuring a subscriber unit for operation in a wireless communications system. Information on available wireless services is advertised through well known, and publicly accessible, broadcast media, for the benefit of potential subscribers. A potential subscriber uses a subscriber unit to access the broadcast media and obtain a set of available wireless services (310). The subscriber unit supplies a particular criteria related to one or more of the available wireless services to a brokering agent, and receives from the brokering agent a list of service providers meeting the criteria (320, 330, 340). The subscriber unit then establishes a subscription relationship with a selected service provider, and self-configures to operate in a mode that supports interaction with the service provider (350).

5 Claims, 2 Drawing Sheets

METHOD FOR SUBSCRIBING TO A WIRELESS SERVICE

TECHNICAL FIELD

This invention relates in general to wireless communication services, and more particularly, to the establishment of subscriptions to wireless services from various wireless service providers.

BACKGROUND

Wireless services have traditionally been offered to subscribers through service providers with which they are already affiliated. As networks converge, or common standards adopted, there is a need to make available wireless services from non-affiliated service providers to potential subscribers. Traditional approaches for the establishment of service provider affiliation limit the choices for potential subscribers. Consider for example, a user having an existing communication device that wishes to operate in a community in which a variety of wireless services are offered from various service providers. In order to gain access to these services, the user has to select a service provider with which to establish an affiliation. Each service provider may only allow access to some of these services, the overall mix being different from that desired by the user. Thus, there may not be a convenient way to subscribe to the particular mix of services sought by the user.

New communication devices are being proposed or planned that are software definable to support multiple protocols and services. Such device may be a combination of techniques that include multi-band antennas and tuned frequency selective RF conversion; wideband analog-to-digital conversion (ADC) and digital-to-analog conversion (DAC); and the use of general-purpose digital signal processors (DSP) to implement intermediate frequency, base band and bit stream-processing functions. One example of a software defined radio is described in U.S. Pat. No. 6,181,734, issued on Jan. 30, 2001, to Palermo for a Multiple Waveform Software Radio, which is hereby incorporated by reference. Palermo states that all processing of the information between reception or reproduction of speech and transmission and reception of radio frequency signals, respectively, is performed in software. Another example of this type of device is described in U.S. Pat. No. 6,091,715, issued on Jul. 18, 2000 to Vucetic, et al., for a Hybrid Radio Transceiver. Vucetic indicates that this type of radio transceiver provides for software-defined parameters to achieve flexibility in modulation and protocol types.

As certain wireless services become commodities, there is a greater demand for more flexibility in the choices for wireless service providers. However, despite the availability of more configurable radio transceivers, subscriber options have not adequately increased. What is needed is a method for more conveniently providing a potential subscriber with a desired set of available wireless services.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
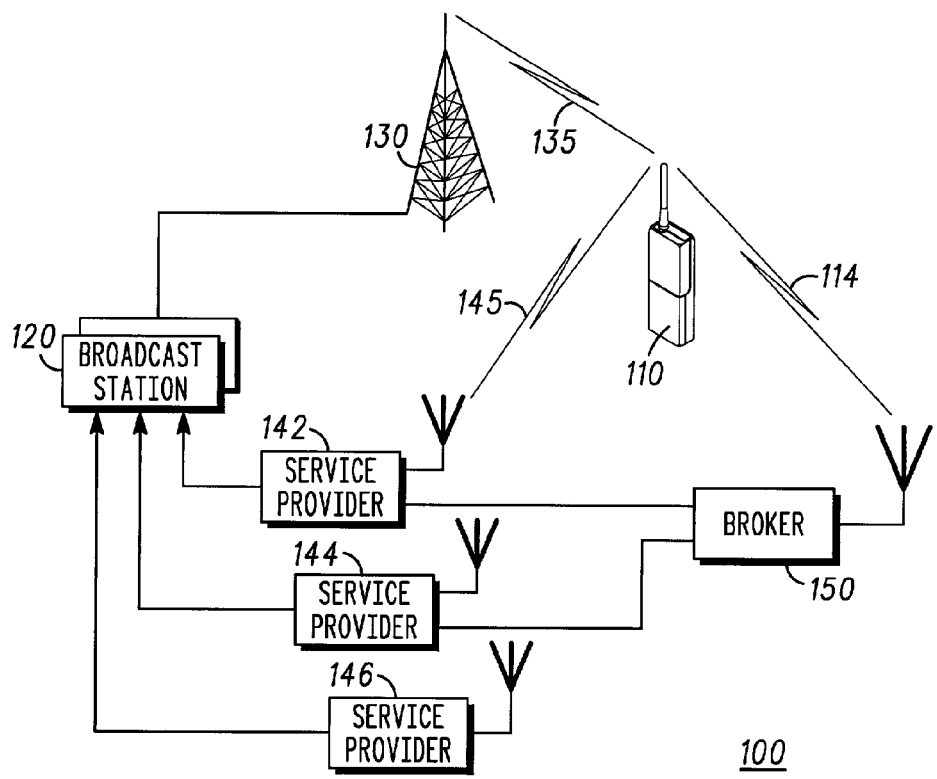
FIG. 1 is a block diagram of a wireless communications system, in accordance of the present invention.

While the specification concludes with claims defining the features of the invention that are regarded as novel, it is believed that the invention will be better understood from a consideration of the following description in conjunction with the drawing figures, in which like reference numerals are carried forward.

The present invention provides a method for configuring a subscriber unit for operation in a wireless communications system. In general, information on available wireless services is advertised through well known, and publicly accessible, broadcast media. Preferably, information on brokering agents is also made available through such media. A subscriber unit capable of operating in the wireless communications system accesses the broadcast media and obtains a set of available wireless services and information corresponding to a brokering agent that provides automated brokering services for independent service providers. The subscriber unit supplies a particular criteria related to one or more of the available wireless services to the brokering agent, and receives from the brokering agent a list of service providers meeting the criteria. In response to a selection of a particular service provider from the list, the subscriber unit establishes a subscription relationship with that provider. Using information received from the service provider, the subscriber unit self-configures to operate in a mode that supports interaction with the service provider.

FIG. 1 shows a wireless communications system 100, in accordance with the present invention. The system includes one or more broadcast stations 120, various independent service providers 142,144,146, a brokering agent 150, and a subscriber unit 110. The service providers 142,144,146 provide information concerning available wireless services to a broadcast station 120 for advertising purposes. Although the service providers depicted are independent from each other, independence is not required. The broadcast station 120 interfaces with a transmitter 130 to transmit information concerning available wireless services for reception by potential subscriber units within the communication environment. The subscriber unit 110 is configurable to establish operation with one or more of the service providers with or without the use of the brokering agent. The brokering agent 150 acts as a middleman between the service providers and the subscriber unit, and operates to identify service providers that meet specific criteria established at the subscriber unit.

The service providers 142,144,146 operate, at times in competition, to provide a wide variety of wireless services that are offered to potential subscribers through configurable subscriber units. Offerings include voice communications, and data, video, gaming, navigation, location specific, traffic, and banking services, among other features. The service providers 142,144,146 may operate using different communication protocols or have different pricing structures associated with their services. For example, in one embodiment, at least one of the service providers is a Uniform Resource Locator (URL) based resource, such as a web site or Internet resource, that links a variety of services with a subscriber via wireless local area networks. The service providers 142,144, 146 advertise their offerings through a medium that is commonly accessible to potential subscriber units, and provide such information as features, pricing, service characteristics and requirements, availability, and geographic limitations if any, and sufficient information to allow a subscriber unit to communicate directly with an individual service provider or its agent.

The broadcast station 120 provides a medium for advertising available wireless services to potential subscribers. Preferably, the broadcast station 120 transmits on a particular well-known predesignated channel using a communication protocol widely supported among potential subscriber units. In one approach, the broadcast station 120 and transmitter 130 functions are provided by a wireless local area network, such as defined by the IEEE 802.11 or IEEE 802.15 standards. In another approach useful in the United States of America and other countries with similar regulations, the broadcast station is a radio station such as a frequency modulation (FM) station. The radio station has standard information services, such as music, sports, news, etc., broadcasted on a particular FM channel. In addition to its standard FM broadcasts, the radio station employs a subsidiary communication authorization (SCA) subcarrier channel for broadcasting supplementary information. Typically, according to the Federal Communications Commission (FCC) regulations, an SCA subcarrier channel can be anywhere above 20 kHz of the center frequency of the broadcast channel (or above 55 kHz for stereo transmitters), and has a maximum deviation of 7.5 kHz. Currently, such subcarrier channels are used for various services such as commercial free music (MUZAK), stock quotes, and the like. However, in the present embodiment, the subcarrier channel is used for the aforementioned advertising purposes. Preferably, the radio station continuously broadcasts on the SCA subcarrier, information on services and communication information for corresponding service providers, or for agents that provide brokering services. A broadcast on the SCA subcarrier can provide wide area coverage of up to a radius of 30 miles around the transmit tower.

The brokering agent 150 is a broker for wireless services that interfaces with various service providers to obtain information on their offerings and to act on behalf of the provider or potential purchaser of such services. The brokering agent 150 may also act as a neutral middleman that facilitates the establishment of a subscription relationship between a subscriber unit and a service provider. The brokering agent 150 operates to collect from a subscriber unit, criteria information concerning desired services, and to select one or more service providers that meet the specified criteria. In one embodiment, the brokering agent 150 has relationships with particular service providers for promoting their services, and is active in advertising service offerings from these service providers through the broadcast station. The brokering agent 150 advertises on the broadcast station 120 and provides the information on available services and/or protocol and other specific information necessary for a potential subscriber unit to automatically communicate with the brokering agent 150.

Figure 2:
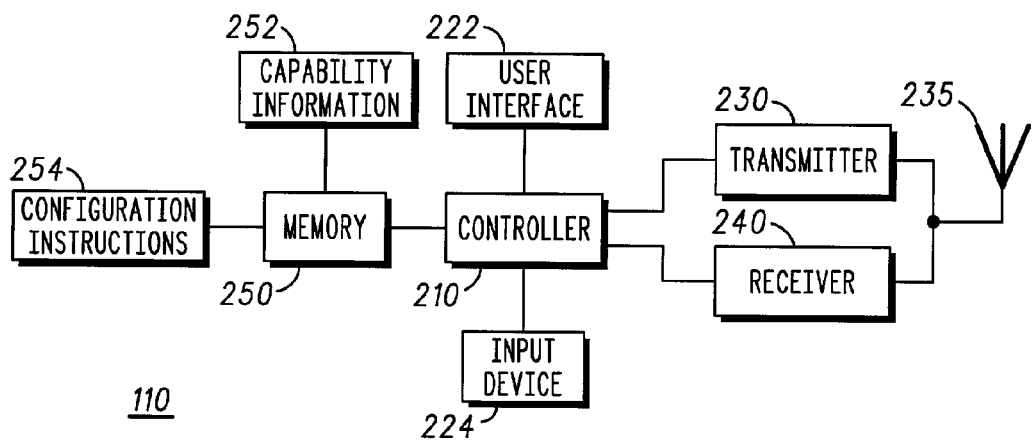
FIG. 2 is a block diagram of a communication device operable as a subscriber unit in the wireless communication system of FIG. 1, in accordance of the present invention.

FIG. 2 shows a block diagram of the subscriber unit 110, in accordance with the present invention. The subscriber unit 110 is preferably an electronic two-way wireless radio transceiver capable of communicating over radio frequency channels. Furthermore, the subscriber unit 110 is a software defined radio, i.e., capable of operating using multiple protocols or configurations, according to a set of programmable software instructions. The subscriber unit 110 includes a controller 210 coupled to a configurable receiver 220 and to a configurable transmitter 230. The receiver 220 and a transmitter 230 are both configurable to operate under various communication protocols and operating bands. A wide-band or multiple-band antenna 225 is coupled to the receiver 220 and to the transmitter 230. A user interface 240 is coupled to the controller 210 and includes one or more input devices such as a keypad and cursor control keys (not shown), and output devices such as a display and audio generating device (not shown). A memory 250 contains a protocol database 252, a configuration database 254, and an instructions database 256, among its various contents. The protocol, configuration, and instructions databases contain the data and instructions for configuring the subscriber unit to function under various protocols and operating bands, according to known principles of a software definable radio.

The subscriber unit 110 is configurable to provide a user with access to a variety of services, including basic operation in a wireless communication system. For example, a subscriber unit may not yet be yet affiliated with any particular service provider, and the user may wish to select a service provider. In another example, the user may have entered into a local service area and wish to configure the subscriber unit to obtain locally available services. In yet another instance, a user may wish to add services available from service providers having no affiliation with the base service provider for the subscriber unit.

Figure 3:
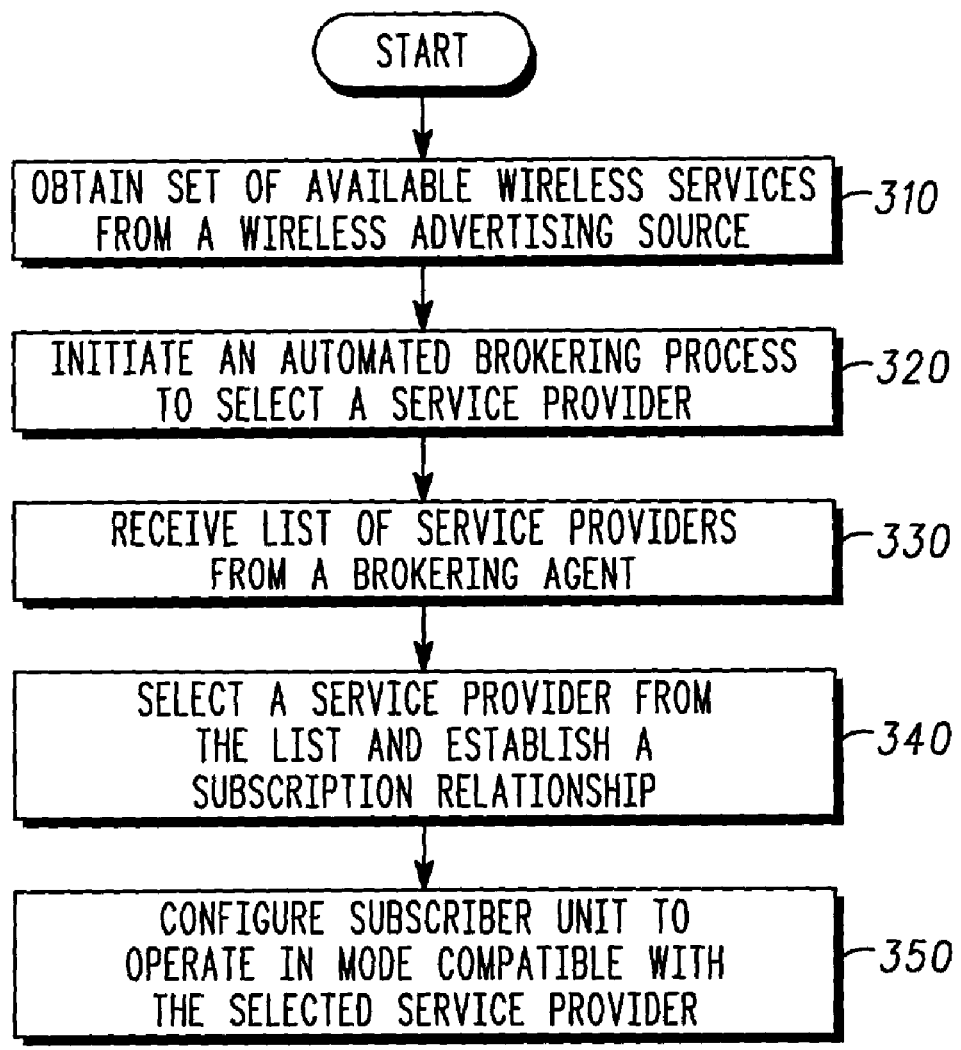
FIG. 3 is a flowchart of procedures used by the subscriber unit of FIG. 2 to select a wireless service and to establish an affiliation with a service provider, in accordance with the present invention.

FIG. 3 shows a flowchart of procedures 300 used for configuring a subscriber unit to access a particular wireless service, in accordance with the present invention. First, the subscriber unit is caused to obtain a set of available wireless services from an information source that advertises wireless services, step 310. In the preferred embodiment, a subscriber unit, having no affiliation with any service provider, receives an over-the-air transmission from a frequency modulation broadcast channel of a radio station, which transmission has information on wireless services available from independent service providers. In another embodiment, the subscriber unit receives similar information through an over-the-air transmission from a wireless local area network. Preferably, the transmission additionally includes information corresponding to one or more brokering agents that provide automated brokering services for various service providers. The subscriber unit presents the obtained information on available wireless services on an output device associated with subscriber unit, and accepts a set of selected services via an input device associated with the subscriber unit. In another embodiment, the subscriber unit may already have an affiliation with a service provider, but is manually or automatically configured to receive the over-the-air transmission in order to access additional services. In this example, the subscriber unit accepts a request for a particular wireless service from an associated input device. When the subscriber unit does not support the particular wireless service, the subscriber unit automatically obtains information on available wireless services and the corresponding service providers from an agent or information source that advertises available wireless services.

The subscriber unit then initiates an automated brokering process to select a service provider, step 320. Using information obtained from the advertising source, an automated brokering process compares service offerings among various independent or affiliated service providers. Preferably, a brokering agent is supplied with a particular criteria related to one of the available wireless services. The brokering agent is then caused to accept, from competing service providers or others that offer the selected service or services, bids that satisfying the particular criteria. The subscriber unit receives from the brokering agent a list of one or more service providers satisfying the supplied criteria and selects a preferred service provider from the list with which to establish a subscription relationship, steps 330, 340. Upon selecting a service provider for the desired wireless service, the subscriber unit self-configures using resident configuration and protocol instructions, and/or information received from the advertising source, the brokering agent, or the service provider, to operate in a mode that is compatible with the service provider and the associated wireless service, step 350.

The present invention provides significant advantages over the prior art. The software definable radio aspects of the subscriber unit and the ability to obtain information on available wireless services and corresponding service providers are utilized to provide a user with great flexibility in selecting wireless services. Moreover, the use of a brokering agent to assist in the process operates to decrease costs and increase convenience, thereby enhancing user experience.

While the preferred embodiments of the invention have been illustrated and described, it will be clear that the invention is not so limited. For example, the present invention contemplates that the subscriber unit may bypass the use of a brokering agent and use information obtained from the advertising source to select and configure the unit. Numerous other modifications, changes, variations, substitutions and equivalents will occur to those skilled in the art without departing from the spirit and scope of the present invention as defined by the appended claims.

We claim:

1. A method of configuring a subscriber unit for operation in a wireless communication system, comprising the steps of, at the subscriber unit:

obtaining over a broadcast RF subcarrier of a commercial FM broadcast station, communication information necessary for the subscriber unit to automatically communicate with a brokering agent that provides automated brokering services for a plurality of wireless service providers;

selecting a particular service provider from the plurality of wireless service providers based on offerings of the wireless services;

using the communication information to communicate to the brokering agent the identity of the particular wireless service;

establishing a subscription relationship with the particular service provider that has been brokered by the brokering agent; and configuring the subscriber unit to operate in a mode that supports interaction with the particular service provider.

2. The method according to claim 1, wherein the selecting of the particular wireless service is based upon information concerning the offerings of the wireless services that is communicated over the broadcast RF subcarrier of the commercial FM broadcast station.

3. The method according to claim 1, wherein the selecting of the particular wireless service is based upon information concerning the offerings of the wireless services that is communicated to the subscriber unit from the brokering agent using the communication information.

4. The method according to claim 1, further comprising:

communicating criteria from the subscriber unit to the brokering agent using the communication information;

selecting one or more wireless services meeting the criteria, wherein the selecting is performed by the brokering agent based on the criteria;

communicating the one or more wireless services meeting the criteria from the brokering agent to the subscriber unit.

5. The method according to claim 1, wherein the selecting of the particular wireless service is performed at the subscriber unit and is communicated to the brokering agent using the communication information.

* * * * *